(12) United States Patent
Luszczak et al.

(10) Patent No.: US 12,287,698 B2
(45) Date of Patent: *Apr. 29, 2025

(54) QUERY WATCHDOG

(71) Applicant: Databricks, Inc., San Francisco, CA (US)

(72) Inventors: Alicja Luszczak, Amsterdam (NL); Srinath Shankar, Belmont, CA (US); Shi Xin, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,316

(22) Filed: May 22, 2023

(65) Prior Publication Data
US 2023/0359516 A1    Nov. 9, 2023

Related U.S. Application Data

(63) Continuation of application No. 17/537,124, filed on Nov. 29, 2021, now Pat. No. 11,693,723, which is a continuation of application No. 16/793,921, filed on Feb. 18, 2020, now Pat. No. 11,216,324, which is a continuation of application No. 15/809,907, filed on Nov. 10, 2017, now Pat. No. 10,606,675.

(51) Int. Cl.
*G06F 11/07* (2006.01)
*G06F 11/30* (2006.01)
*G06F 11/34* (2006.01)

(52) U.S. Cl.
CPC ...... *G06F 11/0757* (2013.01); *G06F 11/0721* (2013.01); *G06F 11/076* (2013.01); *G06F 11/0793* (2013.01); *G06F 11/3024* (2013.01); *G06F 11/3419* (2013.01); *G06F 2201/81* (2013.01); *G06F 2201/88* (2013.01)

(58) Field of Classification Search
CPC .......... G06F 11/0757; G06F 11/0721; G06F 11/076; G06F 11/0793; G06F 11/3024
See application file for complete search history.

(56) References Cited

U.S. PATENT DOCUMENTS 11,693,723 B2 *   7/2023   Luszczak ............ G06F 11/3024
                                                            714/47.2

* cited by examiner

*Primary Examiner* — Nadeem Iqbal
(74) *Attorney, Agent, or Firm* — Fenwick & West LLP

(57) ABSTRACT

A system for monitoring job execution includes an interface and a processor. The interface is configured to receive an indication to start a cluster processing job. The processor is configured to determine whether processing a data instance associated with the cluster processing job satisfies a watchdog criterion; and in the event that processing the data instance satisfies the watchdog criterion, cause the processing of the data instance to be killed.

20 Claims, 7 Drawing Sheets

QUERY WATCHDOG

CROSS REFERENCE TO OTHER APPLICATIONS

This application is a continuation of U.S. patent application Ser. No. 17/537,124, entitled QUERY WATCHDOG filed Nov. 29, 2021, which is a continuation of U.S. patent application Ser. No. 16/793,921, now U.S. Pat. No. 11,216,324, entitled QUERY WATCHDOG filed Feb. 18, 2020, which is a continuation of U.S. patent application Ser. No. 15/809,907, now U.S. Pat. No. 10,606,675, entitled QUERY WATCHDOG filed Nov. 10, 2017, each of which is incorporated herein by reference for all purposes.

BACKGROUND

In a traditional cluster computing application, cluster computing users share cluster resources (e.g., cluster processing capability, cluster memory, cluster storage, etc.). A cluster typically is able to support many small jobs or one or more large jobs. In some cases an error is made when creating a job, and because of this the job consumes a very large amount of resources (e.g., memory resources, processor resources, etc.). This can lead to the problem of the job consuming the capacity of multiple workers or even a large fraction of the cluster for an extended time crowding out the processing of other jobs.

BRIEF DESCRIPTION OF THE DRAWINGS

Various embodiments of the invention are disclosed in the following detailed description and the accompanying drawings.

DETAILED DESCRIPTION

Figure 1:
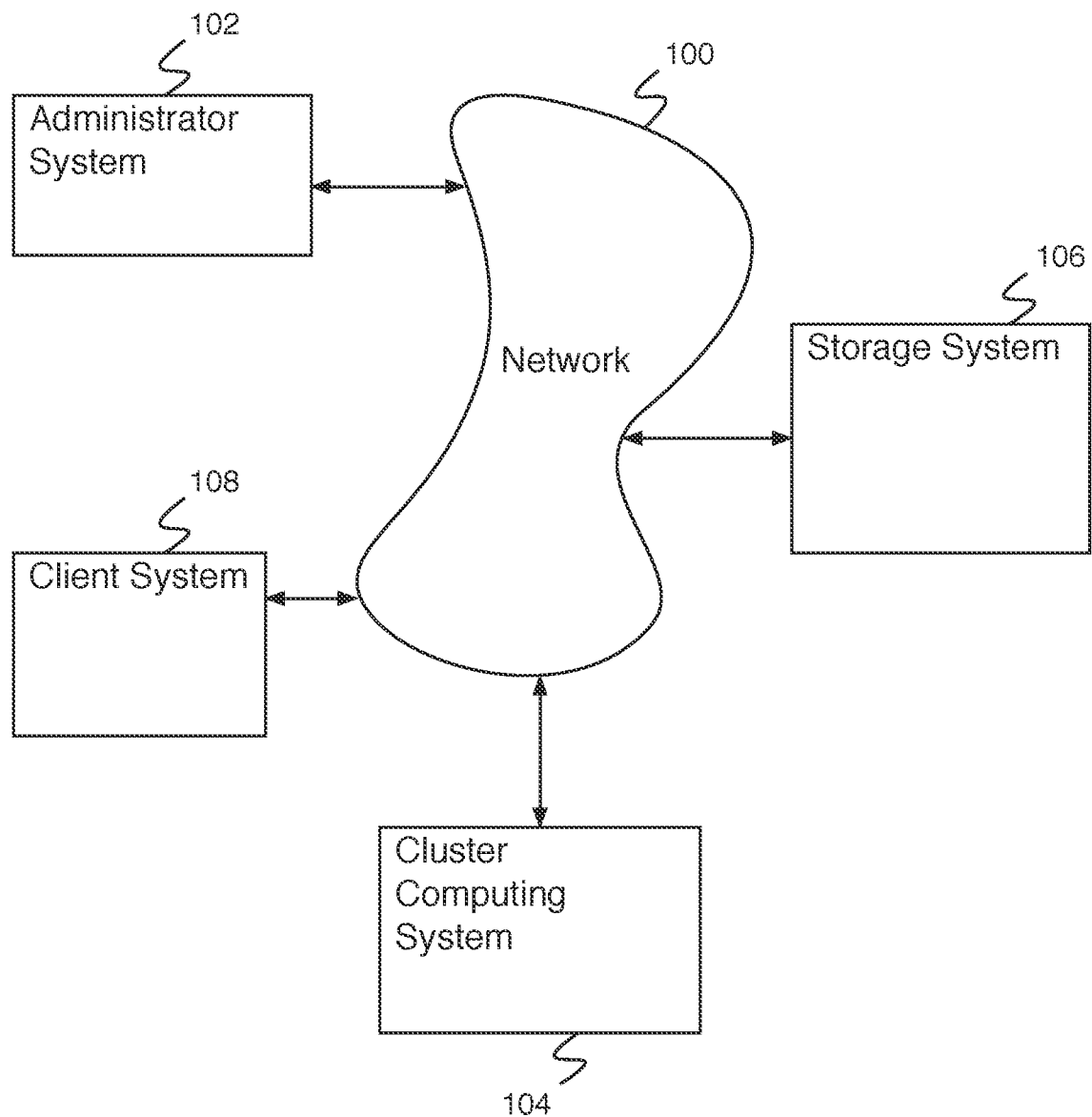
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for monitoring job execution comprises an interface configured to receive an indication to start a cluster processing job, and a processor configured to determine whether processing a data instance associated with the cluster processing job satisfies a watchdog criterion, and in the event that processing the data instance satisfies the watchdog criterion, cause the processing of the data instance to be killed. In some embodiments, the system additionally comprises a memory coupled to the processor and configured to provide the processor with instructions.

A system for monitoring job execution comprises a system for monitoring the execution of data instances (e.g., a row of data, a set of bytes of data, etc.) associated with a job. A cluster system receives an indication to start a cluster processing job, comprising job instructions (e.g., software) and data for processing. The cluster system determines a job allocation for the job (e.g., a set of worker machines of the cluster to perform the job) and begins processing data instances of the data for processing using the job instructions. Given the capabilities of cluster systems, the job can employ a few to hundreds or even thousands of workers and process petabytes or exabytes of data. Because of the magnitude of the processing, there are times when something goes awry and the process consumes unwanted resources and even overtakes other jobs. This is undesirable and likely unproductive. The monitoring system identifies these stuck processes and selectively terminates the parts of the process that are overconsuming. In some cases, in the event that the process continues to have difficulties, the process can be completely terminated. More specifically, the monitoring system, as each data instance is processed, determines whether the processing of the data instance satisfies a watchdog criterion. A watchdog criterion comprises a criterion for determining whether the processing is using an inappropriate amount of resources. The watchdog criterion comprises a space criterion (e.g., the amount of storage for storing the output of processing a data instance, the amount of storage for storing the output of processing the last N data instances), a time criterion (e.g., the amount of time required to process the last data instance, the amount of time required to process the last N data instances), etc. In the event it is determined that processing the data instance satisfies the watchdog criterion, the processing of the data instance is killed or terminated. In some embodiments, the processing of the job is also killed or terminated. In some embodiments, the processing of the job is killed or terminated only after the processing of a threshold number of data instances is determined to satisfy a watchdog criterion.

The monitoring system enables the computation system to operate more efficiently. By providing additional functionality, the monitoring system assures better functionality by removing processes that are not being processed effectively.

FIG. 1 is a block diagram illustrating an embodiment of a network system. In some embodiments, the network system of FIG. 1 comprises a system for a query watchdog. In the example shown, a user using client system 108 requests a job to be executed using cluster computing system 104 to process data stored on storage system 106. Cluster computing system 104 receives the job (e.g., in the form of a program) to execute and breaks the job up to be executed using multiple workers of the cluster. Cluster computing system 104 comprises a cluster computing system for executing cluster computing jobs (e.g., jobs performed by a cluster of worker computers). Cluster computing jobs are requested by other systems (e.g., administrator system 102, client system 108, etc.) that communicate with cluster computing system 104 via network 100. Cluster computing jobs comprise any type of computation processing and these computing jobs are used to process large amounts of data for data analysis, filtering, machine learning, etc. A job requestor provides a job (e.g., comprising code for execution, data to execute the code on, etc.) to cluster computing system 104 and requests its execution. Cluster computing system 104 breaks a job into tasks, and assigns tasks to cluster worker machines. Data is retrieved from storage system 106 and provided to the appropriate cluster worker. Cluster workers process the portions of the job assigned to them and provide the results to a master system that assembles task results to provide back to the requestor. Cluster computing system 104 additionally comprises a cluster storage system for storing data for processing, task results, job results, etc., and a cluster watchdog system for determining whether cluster processing satisfies a watchdog criterion. The cluster watchdog system monitors the job processing in each of the workers processing the distributed portions of the job. Determining whether cluster processing satisfies a watchdog criterion comprises determining whether cluster processing uses an unacceptable amount of resources—for example, if the time to process a row is too long, if the processing of a row generates too much output data, etc. In the event the cluster watchdog system determines that cluster processing (e.g., processing of a row) satisfies the watchdog criterion, the cluster watchdog causes the processing (e.g., the processing of the row) to be killed or terminated. The killed or terminated process is logged. The process is continued and the process is monitored to see whether more processing of a portion of the job satisfy a watchdog criterion. In the event that the more portions of the job meet the criterion and are killed or terminated, a counter tracks the number of killed or terminated portions and in the event that the number exceeds a threshold, the whole job processing is killed or terminated. The cluster watchdog system includes a master watchdog system and/or a worker watchdog system. In some cases, the worker watchdog system(s) report conditions up to the master watchdog system and the information is aggregated to determine global conditions that may trigger an action. Note that the criterions can be different depending on whether implemented at a master or worker level—the master level might have an additional criterion that requires input from multiple workers (which can't be done by a single worker watchdog system).

Client system 108 comprises a system for accessing data stored on storage system 106 and requesting computations to be performed using cluster computing system 104. In various embodiments, network 100 provides a means for communicating between administrator system 102, cluster computing system 104, client system 108, and storage system 106 and comprises one or more of the following: a local area network, a wide area network, a wired network, a wireless network, the Internet, an intranet, a storage area network, or any other appropriate communication network. Administrator system 102 enables an administrator to maintain cluster computing system 104. Administrator system 102 comprises a system for executing administrator commands, for configuring storage system 106 or cluster computing system 104, for querying storage system 106 or cluster computing system 104, etc. Storage system 104 comprises a storage system for storing data (e.g., client data, administrator data, etc.).

Figure 2A:
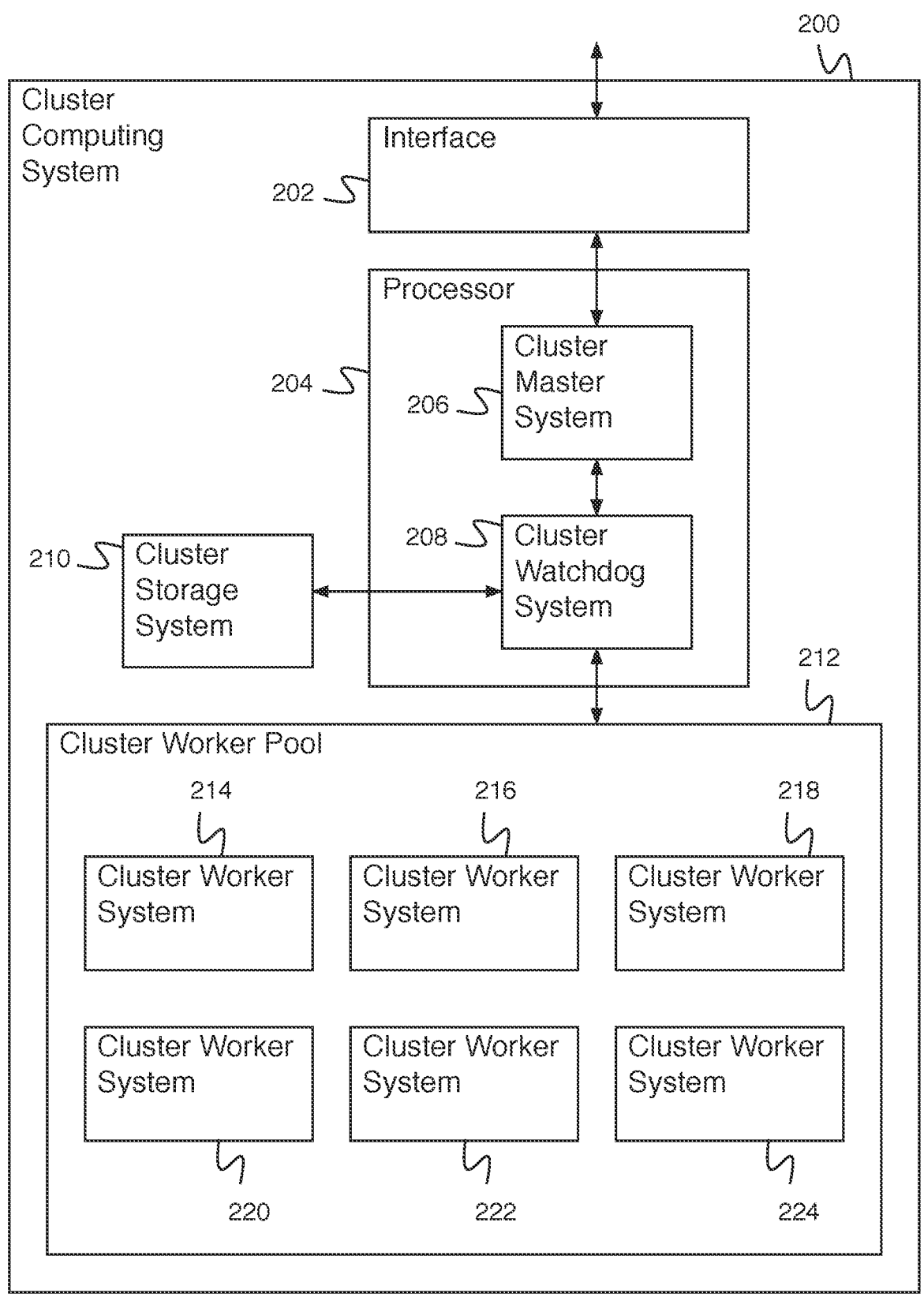
FIG. 2A is a block diagram illustrating an embodiment of a cluster computing system.

FIG. 2A is a block diagram illustrating an embodiment of a cluster computing system. In some embodiments, cluster computing system 200 comprises cluster computing system 104 of FIG. 1. In the example shown, cluster computing system 200 comprises interface 202 (e.g., an interface for communicating with the systems of FIG. 1 via network 100 of FIG. 1. Interface 202 receives an indication to start a cluster processing job, the code to run for the processing, and a pointer to the input data. Processor 204 comprises a processor for processing data. Processor 204 comprises cluster master system 206 that manages the cluster processing job and breaks the cluster processing job into tasks (e.g., portions of a cluster processing job) and monitors the cluster processing job using cluster watchdog system 208 (e.g., a system for determining whether a cluster processing job satisfies a watchdog criterion). Cluster processor 204 distributes the tasks of the processing job to cluster worker pool 212 to one or more assigned cluster worker systems (e.g., cluster worker system 214, cluster worker system 216, cluster worker system 218, cluster worker system 220, cluster worker system 222, cluster worker system 224, etc.) by providing the code to run and a pointer to the segment of input data or the input data itself (e.g., cluster processor 204 uses the pointer to acquire the necessary data and stores in cluster storage system 210 and/or transfers the data to the appropriate cluster worker system. Cluster storage system 210 is also used for storing a cluster processing job, for storing task results, for storing cluster processing job results, for storing an indication that part or all of a cluster processing job was killed or terminated, etc. Cluster watchdog system 208 observes communications between cluster master system 206, cluster storage system 210, and cluster worker pool 212. Cluster watchdog system 208 determines whether processing a data instance associated with a cluster processing job satisfies a watchdog criteria (e.g., based at least in part on the communications between cluster master system 206, cluster storage system 210, and cluster worker pool 212). In some embodiments, the data instance comprises a row (e.g., a row of a data table). In some cases, cluster watchdog system 208 monitors processing within a cluster worker system or monitors data stored within the cluster worker system to determine progress of a task execution. In the event that processing the data instance satisfies the watchdog criterion, cluster watchdog system 208 causes processing of the data instance to be killed or terminated.

Figure 2B:
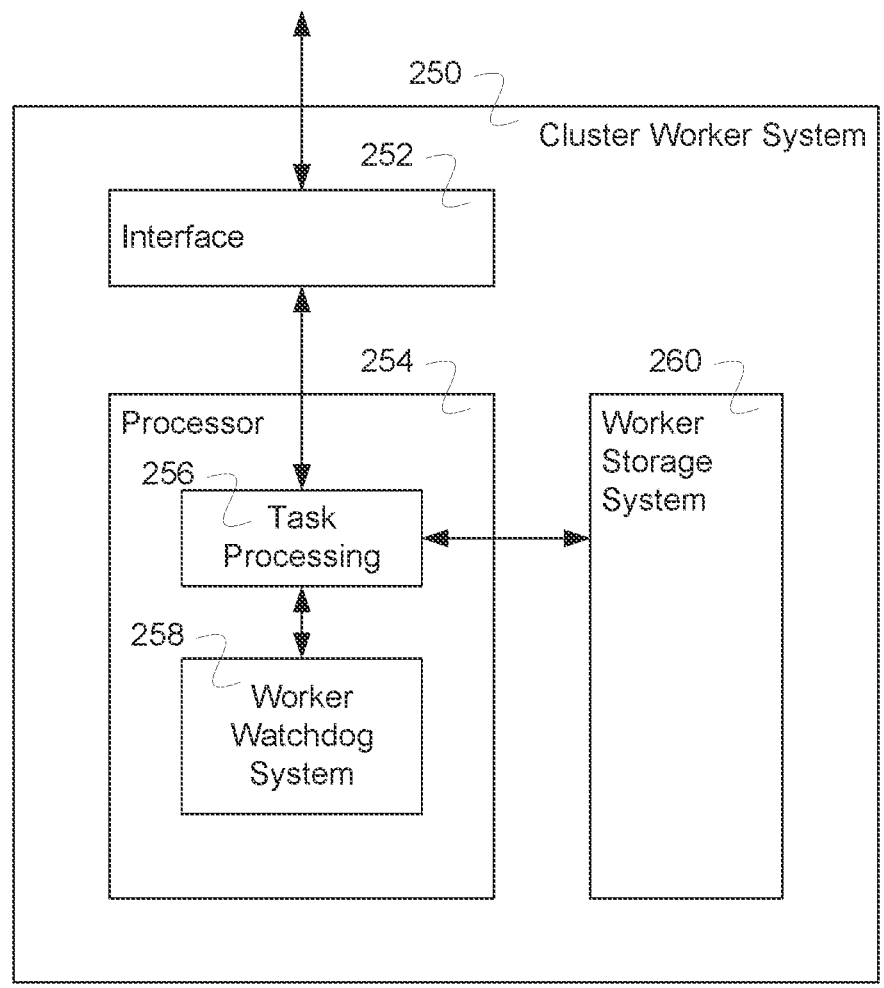
FIG. 2B is a diagram illustrating an embodiment of a cluster worker system.

FIG. 2B is a diagram illustrating an embodiment of a cluster worker system. In some embodiments, cluster worker system 250 is used to implement a cluster worker system of FIG. 2A (e.g., cluster worker system 214, cluster worker system 216, cluster worker system 218, cluster worker system 220, cluster worker system 222, or cluster worker system 22). In the example shown, cluster worker 250 receives and provides communications via interface 252 (e.g., using a bus or other wired, wireless, or fiber communication link. Processor 254 receives tasks to process along with data or access indications to the data, processes the tasks (e.g., using task processing 256), and provides the output of the processing via interface 252. Data is stored locally using worker storage system 260. In addition, worker watchdog system 258 is used to monitor tasks performed on cluster worker system 250. In some cases, worker watchdog system 258 monitors processing within cluster worker system 250 or monitors data stored within the worker storage system 260 to determine progress of a task execution. In the event that processing a data instance satisfies the watchdog criterion, worker watchdog system 258 causes processing of the data instance to be killed or terminated. In the situation with a cluster watchdog system and a worker watchdog system, the watchdog criteria for the cluster watchdog system are criteria looking across multiple worker systems, whereas the watchdog criteria for the worker watchdog system are criteria looking only at the local worker system.

Figure 3:
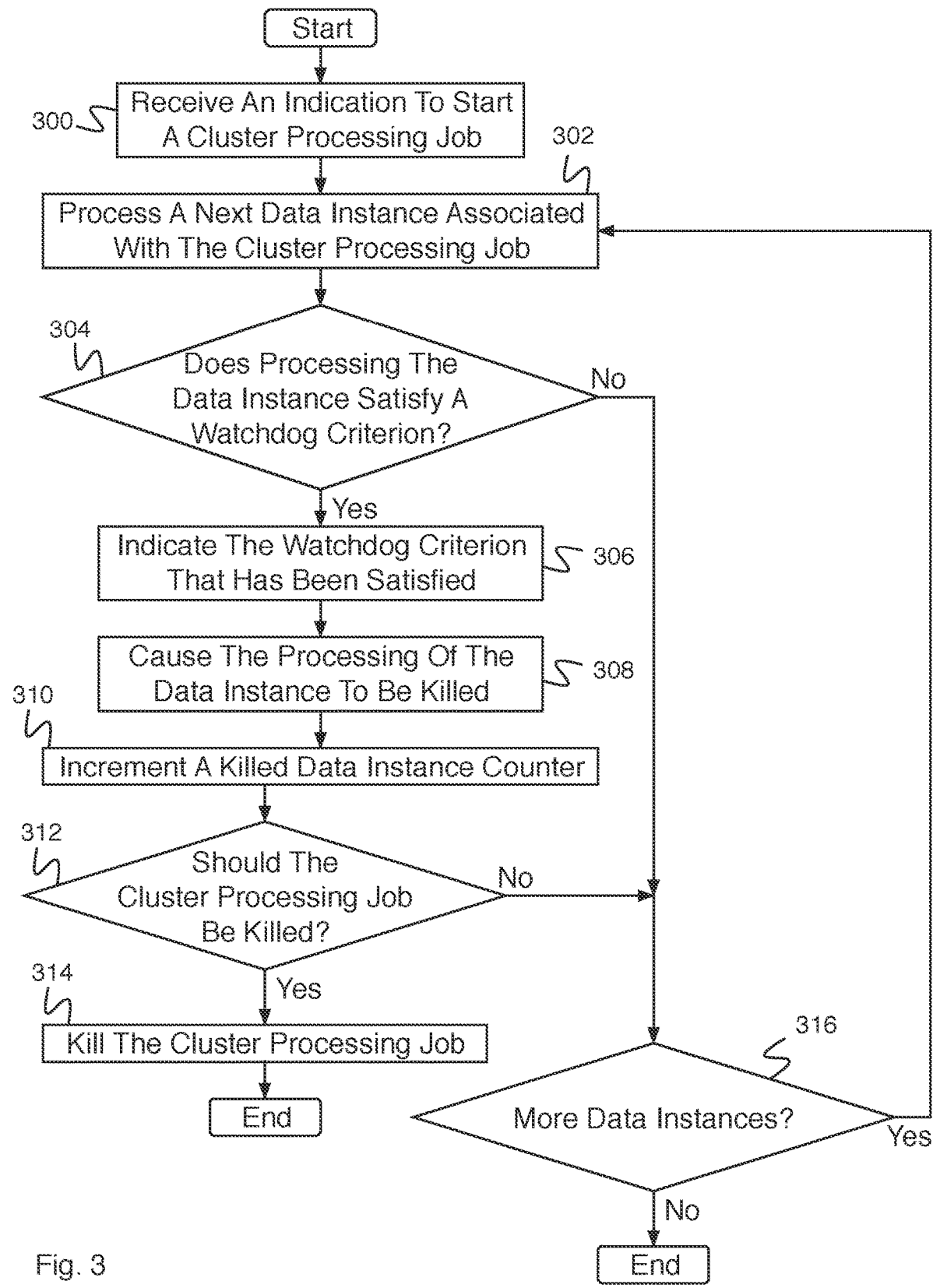
FIG. 3 is a flow diagram illustrating an embodiment of a process for a query watchdog.

FIG. 3 is a flow diagram illustrating an embodiment of a process for a query watchdog. In some embodiments, the process of FIG. 3 is executed by cluster computing system 200 of FIG. 2. In the example shown, in 300, an indication is received to start a cluster processing job. For example, the interface of the cluster computing system receives a request to process a job along with necessary code and data or pointer to the data. In 302, a next data instance associated with the cluster processing job is processed. For example, the processor of the cluster compute system breaks the processing job into tasks and distributes the tasks to worker systems. As a task is executed, the processor monitors the execution and determines whether the process is advancing—for example, the processing of a data instance or a row or subset of data or the task itself (e.g., a subset of the entire job allocated to a processor) is advancing appropriately. In some embodiments, the next data instance comprises the first data instance. In 304, it is determined whether processing the data instance satisfies a watchdog criterion. In the event it is determined that processing the data instance does not satisfy a watchdog criterion, control passes to 316. In the event is determined that processing the data instance satisfies a watchdog criterion, control passes to 306. In 306, the process indicates that the watchdog criterion has been satisfied. In 308, the processing of the data instance is caused to be killed. For example, the processing of the row, the subset of data, the task (e.g., a subset of the entire job), or the entire job is killed. In the case where the entire job or task are killed, then 312 and 314 are not included as part of the process. In some embodiments, an indication that the processing of the data instance was caused to be killed is stored in an output file. In 310, a killed data instance counter is incremented. In 312, it is determined whether the cluster processing job should be killed. For example, the job is killed if a number of the tasks or a number of instances are killed greater than a threshold. In some cases the processing job is killed based on other criteria—for example, a ratio of output to input being greater than a threshold value, a time to process being greater than a threshold value, etc. In the event it is determined that the cluster processing job should not be killed, control passes to 316. In the event it is determined that the cluster processing job should be killed, control passes to 314. In 314, the cluster processing job is killed, and the process ends. In 316, it is determined whether there are more data instances. In the event it is determined that there are not more data instances, the process ends. In the event it is determined that there are more data instances, control passes to 302.

Figure 4:
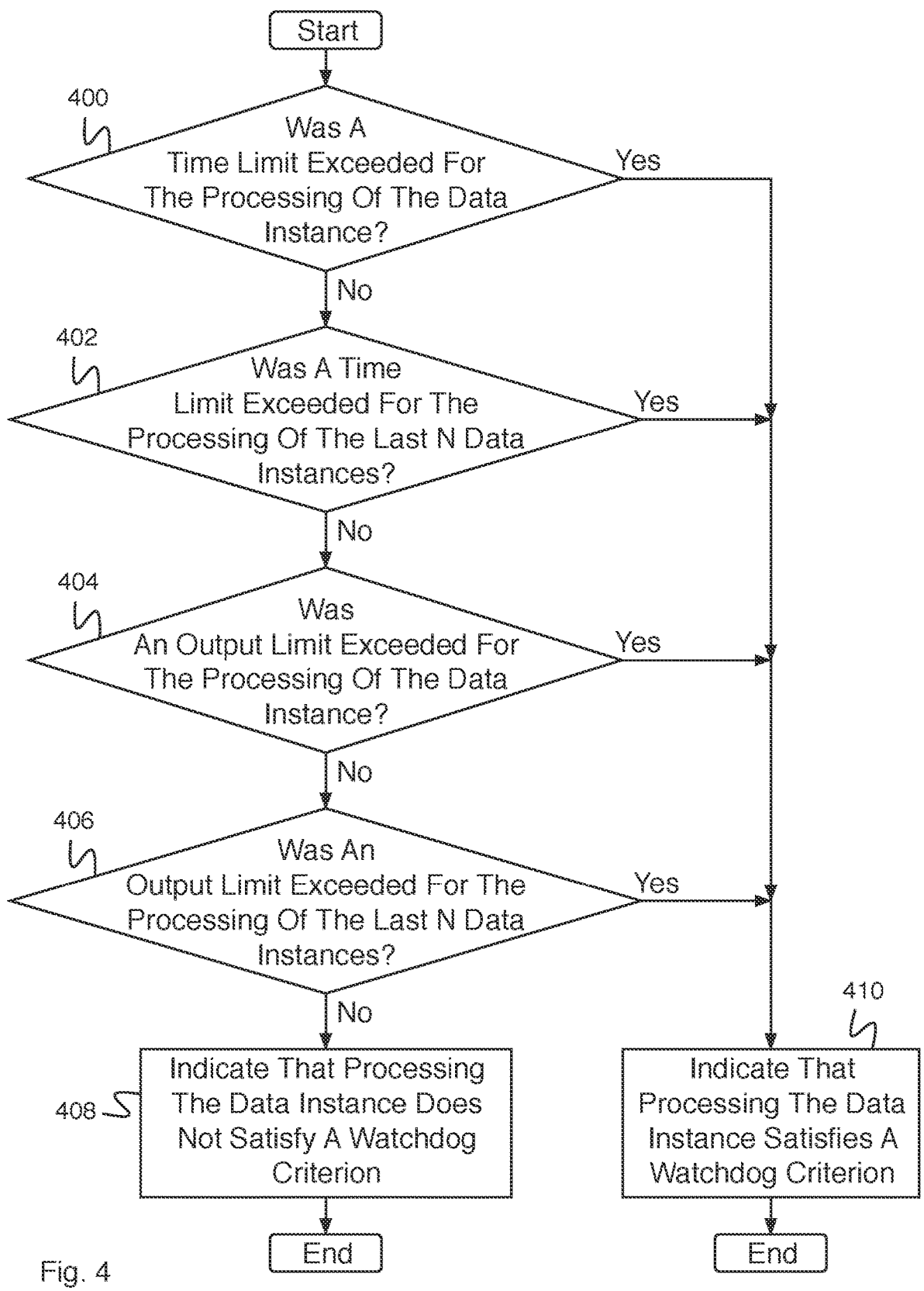
FIG. 4 is a flow diagram illustrating an embodiment of a process for determining whether a data instance satisfies a watchdog criterion.

FIG. 4 is a flow diagram illustrating an embodiment of a process for determining whether a data instance satisfies a watchdog criterion. In some embodiments, the process of FIG. 4 implements 304 of FIG. 3. In the example shown, in 400, it is determined whether a time limit was exceeded for the processing of the data instance. In the event it is determined that a time limit was exceeded for the processing of the data instance, control passes to 410. In the event it is determined that a time limit was not exceeded for the processing of the last data instance, control passes to 402. In 402, it is determined whether a time limit was exceeded for the processing of the last N data instances (e.g., wherein N comprises a predetermined number of data instances for a time limit). In the event it is determined that a time limit was exceeded for the processing of the last N data instances, control passes to 410. In the event it is determined that a time limit was not exceeded for the processing of the last N data instances, control passes to 404. In 404, it is determined whether an output limit was exceeded for the processing of the data instance. In various embodiments, an output limit comprises a number of output bytes, a number of output data instances, a number of output rows, a number of output files, or any other appropriate output limit). In the event it is determined that an output limit was exceeded for the processing of the data instance, control passes to 410. In the event it is determined that an output limit was not exceeded for the processing of the data instance, control passes to 406. In 406, it is determined whether an output limit was exceeded for the processing of the last N data instances (e.g., wherein N comprises a predetermined number of data instances for an output limit). In the event it is determined that an output limit was exceeded for the processing of the last N data instances, control passes to 410. In the event it is determined that an output limit was not exceeded for the processing of the last N data instances, control passes to 408. In 408, the process indicates that processing the data instance does not satisfy a watchdog criterion, and the process ends. In 410, the process indicates that processing the data instance satisfies a watchdog criterion.

In some embodiments, the watchdog criteria are checked in an order, as for example in the order above, but any other order is possible and potentially equally appropriate.

In some embodiments, a watchdog criterion includes testing to see whether a processor has not processed a record or row in a time exceeding a threshold. Other watchdog criteria or tests are potentially used as appropriate.

Figure 5:
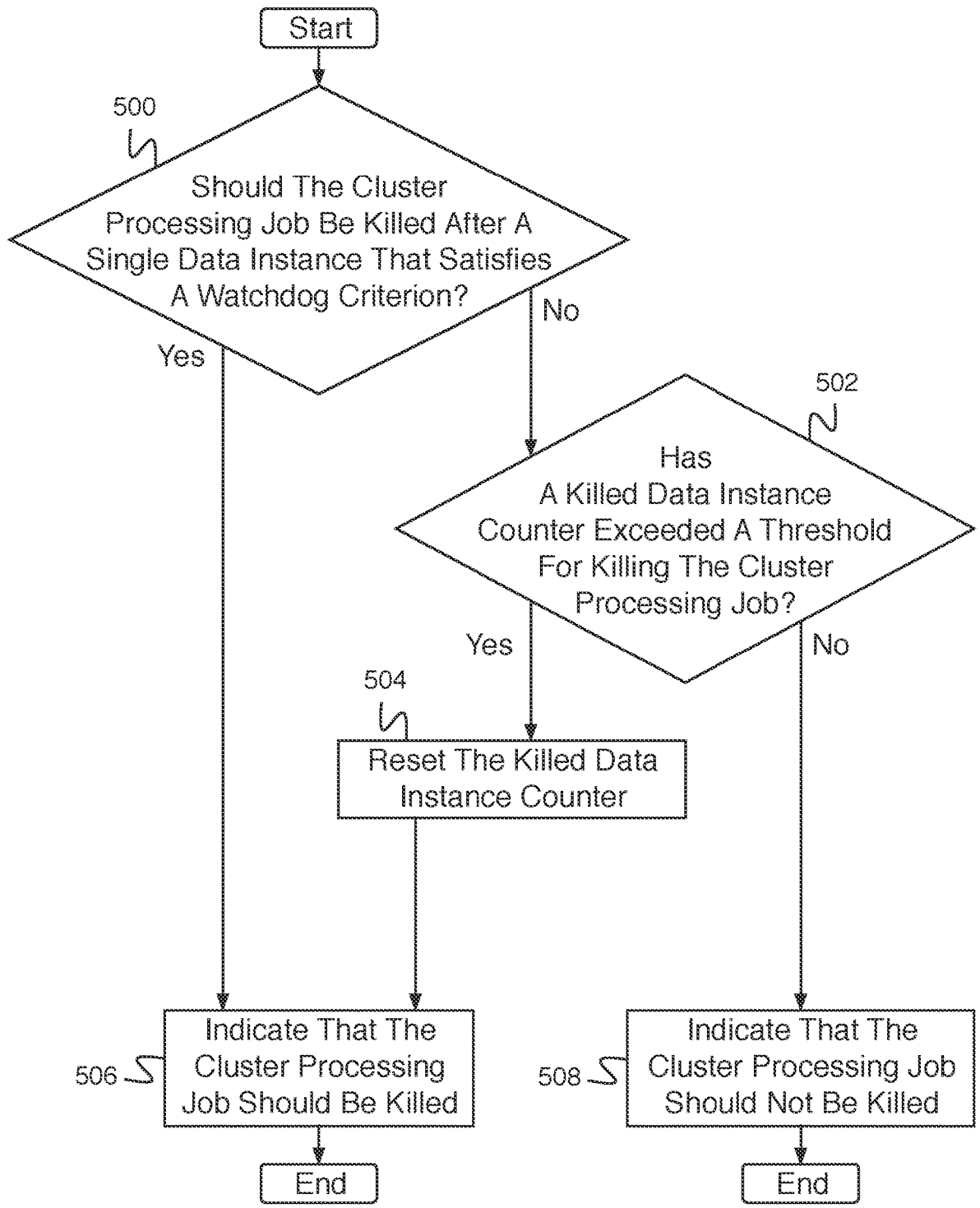
FIG. 5 is a flow diagram illustrating an embodiment of a process for determining whether a cluster processing job should be killed.

FIG. 5 is a flow diagram illustrating an embodiment of a process for determining whether a cluster processing job should be killed. In some embodiments, the process of FIG. 5 implements 312 of FIG. 3. In the example shown, in 500, it is determined whether the cluster processing job should be killed after a single data instance that satisfies a watchdog criterion. For example, the processing job is killed after a row, a certain subset size of data, or the entire task satisfies a watchdog criteria. In the event it is determined that the cluster processing job should be killed after a single data instance that satisfies a watchdog criterion, control passes to 506. In the event it is determined that the cluster processing job should not be killed after a single data instance that satisfies a watchdog criterion, control passes to 502. In 502, it is determined whether a killed data instance counter exceeds a threshold for killing the cluster processing job. For example, the processing job is killed after a certain number of rows, a certain number of subsets size of data, or certain number of tasks exceed a threshold number. In the event it is determined that the killed data instance counter has exceeded a threshold for killing the cluster processing job, control passes to 504. In the event it is determined that a killed data instance counter has not exceeded a threshold for killing the cluster processing job, control passes to 508. In 508, the process indicates that the cluster processing job should not be killed, and the process ends. In 504, the killed data instance counter is reset. In 506, the process indicates that the cluster processing job should be killed.

Figure 6:
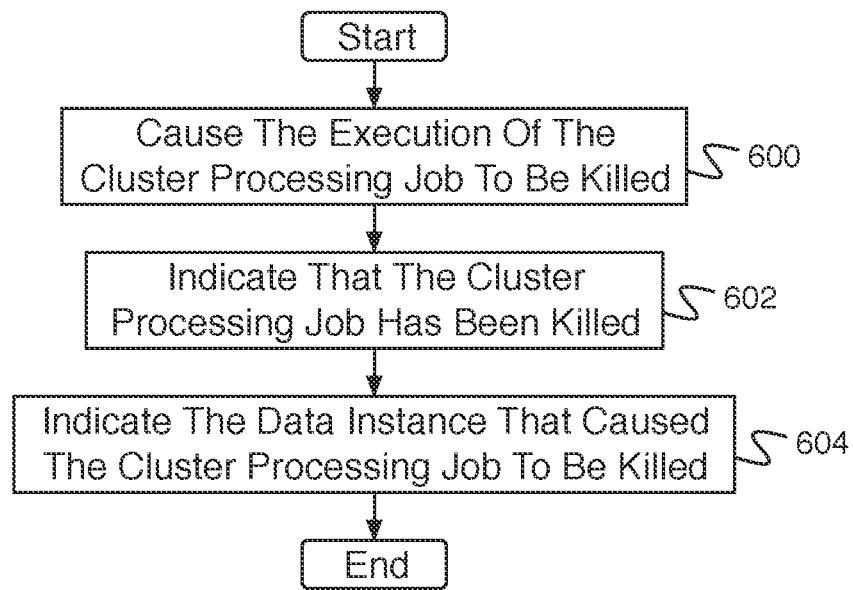
FIG. 6 is a flow diagram illustrating an embodiment of a process for killing a cluster processing job.

FIG. 6 is a flow diagram illustrating an embodiment of a process for killing a cluster processing job. In some embodiments, the process of FIG. 6 implements 314 of FIG. 3. In the example shown, in 600, the execution of the cluster processing job is caused to be killed. In 602, it is indicated that the cluster processing job has been killed. In 604, the data instance that caused the cluster processing job to be killed is indicated. In cases where the tasks are killed at the task level, the indication of the instance that caused the cluster processing job to be killed is not performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
    a processing system comprises of one or more processors; and
    a memory system comprises of one or more memories, the memory system coupled with the processing system, the memory system comprised of stored instructions the instructions when executed causes the processing system to:
        receive an indication that a cluster processing job is starting;
        determine that a time limit is exceeded for processing one or more data instances associated with the cluster processing job or that an output of one or more data instances exceeds an output limit;
        terminate the processing of the one or more data instances in response to the determination that the time limit is exceeded or the output of one or more data instances exceeds the output limit;
        track a number of terminated data instances; and
        indicate that the cluster processing job should be terminated in response to the number of terminated data instances surpassing a threshold.

2. The system of claim 1, wherein the data instance comprises a row and wherein the time limit comprises a predetermined time limit for processing of a most recent N data instances, wherein N comprises a predetermined number of data instances for the predetermined time limit.

3. The system of claim 1, wherein the output limit comprises one of:
    a number of output bytes,
    a number of output data instances,
    a number of output files, and
    a predetermined output limit exceeded during processing of a most recent N data instances, wherein N comprises a predetermined number of data instances for the predetermined output limit.

4. The system of claim 1, wherein the output limit comprises a predetermined output limit exceeded during processing of a most recent N data instances, wherein N comprises a predetermined number of data instances for the predetermined output limit.

5. The system of claim 1, wherein the stored instructions further comprise instructions that when executed causes the processing system to:
    terminate the processing of the cluster processing job.

6. The system of claim 5, wherein the stored instructions further comprise instructions that when executed causes the processing system to:
    store a status indication that the cluster processing job is terminated.

7. The system of claim 6, wherein the stored instructions further comprise instructions that when executed causes the processing system to:
    indicate the data instance that caused the cluster processing job to be terminated.

8. The system of claim 1, wherein the stored instructions further comprise instructions that when executed causes the processing system to:
    indicate the time limit is exceeded or that the output of one or more data instances exceeds the output limit.

9. The system of claim 1, wherein the stored instructions further comprise instructions that when executed causes the processing system to:
    process a next data instance after processing of the one or more data instances is terminated.

10. The system of claim 9, wherein the stored instructions further comprise instructions that when executed causes the processing system to:
    indicate that processing of the one or more data instances was terminated.

11. The system of claim 10, wherein the stored instructions further comprise instructions that when executed causes the processing system to:
    store an indication in an output file that the processing of the one or more data instances was terminated.

12. The system of claim 11, wherein the stored instructions further comprise instructions that when executed causes the processing system to:
    increment a killed data instance counter.

13. The system of claim 12, wherein the stored instructions further comprise instructions that when executed causes the processing system to:
    terminate the cluster processing job in response to a value of the killed data instance counter exceeding a threshold.

14. A method comprising:
    receiving an indication that a cluster processing job is starting;
    determining that a time limit is exceeded for processing one or more data instances associated with the cluster processing job or that an output of one or more data instances exceeds an ouput limit;
    terminating the processing of the one or more data instances in response to the determination that the time limit is exceeded or the output of one or more data instances exceeds the output limit;
    tracking a number of terminated data instances;
    indicating that the cluster processing job should be terminated in response to the number of terminated data instances surpassing a threshold.

15. The method of claim 14, wherein the data instance comprises a row and the time limit comprises a predetermined time limit for processing of a most recent N data instances, wherein N comprises a predetermined number of data instances for the predetermined time limit.

16. The method of claim 14, wherein the output limit comprises at least one of:
 a number of output bytes,
 a number of output data instances,
 a number of output files, and
 a predetermined output limit exceeded during processing of a most recent N data instances, wherein N comprises a predetermined number of data instances for the predetermined output limit.

17. The method of claim 14, further comprising:
 terminating the processing of the cluster processing job;
 storing a status indication that the cluster processing job is terminated;
 indicating the data instance that caused the cluster processing job to be terminated; and
 indicating the time limit is exceeded or that the output of one or more data instances exceeds the output limit.

18. The method of claim 14, further comprising:
 processing a next data instance after processing of the one or more data instances is terminated;
 indicating that processing of the one or more data instances was terminated;
 storing an indication in an output file that the processing of the one or more data instances was terminated;
 incrementing a killed data instance counter; and
 terminating the cluster processing job in response to a value of the killed data instance counter exceeding a threshold.

19. A non-transitory computer readable medium comprising stored instructions encoded thereon that, when executed by a processor, cause at least one processor to:
 receive an indication that a cluster processing job is starting;
 determine that a time limit is exceeded for processing one or more data instances associated with the cluster processing job or that an output of one or more data instances exceeds an output limit;
 terminate the processing of the one or more data instances in response to the determination that the time limit is exceeded or the output of one or more data instances exceeds the output limit;
 track a number of terminated data instances; and
 indicate that the cluster processing job should be terminated in response to the number of terminated data instances surpassing a threshold.

20. The non-transitory computer readable medium of claim 19, wherein the data instance comprises a row and the time limit comprises a predetermined time limit for processing of a most recent N data instances, wherein N comprises a predetermined number of data instances for the predetermined time limit.

* * * * *

UNITED STATES PATENT AND TRADEMARK OFFICE
CERTIFICATE OF CORRECTION

PATENT NO. : 12,287,698 B2  
APPLICATION NO. : 18/200316  
DATED : April 29, 2025  
INVENTOR(S) : Luszczak et al.

Page 1 of 1

It is certified that error appears in the above-identified patent and that said Letters Patent is hereby corrected as shown below:

In the Claims

In Column 7, in Claim 1, Line 35, after "instructions" insert -- , --.

In Column 8, in Claim 14, Line 54, delete "ouput" and insert -- output --, therefor.

Signed and Sealed this  
Twenty-ninth Day of July, 2025

Coke Morgan Stewart  
*Acting Director of the United States Patent and Trademark Office*